(12) United States Patent
Stramigioli et al.

(10) Patent No.: US 12,728,598 B2
(45) Date of Patent: Sep. 8, 2026

(54) IN-SITU MONITORING OF ADDITIVE MANUFACTURING

(71) Applicant: ULTIMAKER B.V., Zaltbommel (NL)

(72) Inventors: Stefano Stramigioli, Enschede (NL); Alexander Dijkshoorn, Enschede (NL); Gijsbertus Jacobus Maria Krijnen, Enschede (NL); Patrick Neuvel, Hengelo (NL)

(73) Assignee: ULTIMAKER B.V., Zaltbommel (NL)

( * ) Notice: Subject to any disclaimer, the term of this patent is extended or adjusted under 35 U.S.C. 154(b) by 431 days.

(21) Appl. No.: 18/022,779

(22) PCT Filed: Aug. 27, 2021

(86) PCT No.: PCT/EP2021/073761
§ 371 (c)(1),
(2) Date: Feb. 23, 2023

(87) PCT Pub. No.: WO2022/043505
PCT Pub. Date: Mar. 3, 2022

(65) Prior Publication Data

US 2024/0033998 A1 Feb. 1, 2024

Related U.S. Application Data

(60) Provisional application No. 63/070,904, filed on Aug. 27, 2020.

(51) Int. Cl.
*B29C 64/393* (2017.01)
*B22F 10/85* (2021.01)
(Continued)

(52) U.S. Cl.
CPC ............ *B29C 64/393* (2017.08); *B22F 10/85* (2021.01); *B33Y 10/00* (2014.12); *B33Y 30/00* (2014.12);
(Continued)

(58) Field of Classification Search
None
See application file for complete search history.

(56) References Cited

U.S. PATENT DOCUMENTS 3,893,828 A * 7/1975 Archer ...................... B03C 3/68 96/19
10,449,721 B2 10/2019 Chung
(Continued)

FOREIGN PATENT DOCUMENTS

CN 101160635 A 4/2008
CN 205553228 U 9/2016
(Continued)

OTHER PUBLICATIONS

Logan D. Sturm, "In situ monitoring of material jetting additive manufacturing process via impedance based measurements", May 22, 2019 (May 22, 2019), XP002804770, Retrieved from the Internet: URL: https://par.nsf.gov/servlets/purl/10211482 [retrieved on Nov. 16, 2021].
(Continued)

*Primary Examiner* — Farah Taufiq
(74) *Attorney, Agent, or Firm* — Young Basile Hanlon & MacFarlane, P.C.

(57) ABSTRACT

A system for additive manufacturing of a product from an electrically conductive depositable material. The system comprises a support element, a material addition system, and two electrodes. The support element supports the product, wherein the two electrodes comprise electrodes configured at a surface of the support element. The material addition system deposits the material at one or more of (i) the support element and (ii) deposited material, thereby forming the product. Any one of the electrodes is configured for (i) electrically contacting the material being deposited or (ii) electrically contacting the deposited material, during depositing of the material. (i) the material is deposited with a
(Continued)

portion of the deposited material and arranged between the electrode and another one of the electrodes to define an electrically conductive path. Alternatively, (ii) a portion of the deposited material is arranged between the electrode and another one of the electrodes to define the electrically conductive path.

7 Claims, 3 Drawing Sheets

(51) Int. Cl.
*B33Y 10/00* (2015.01)
*B33Y 30/00* (2015.01)
*B33Y 50/02* (2015.01)

(52) U.S. Cl.
CPC ...... *B33Y 50/02* (2014.12); *B29K 2995/0005* (2013.01)

(56) References Cited

U.S. PATENT DOCUMENTS 11,260,590 B1 * 3/2022 Missout ................ B29C 64/209
2016/0236414 A1 8/2016 Reese et al.
2017/0197360 A1 7/2017 Batchelder
2019/0160530 A1 * 5/2019 Peters .................... B33Y 10/00
2020/0049648 A1 2/2020 Kunc et al.
2022/0162765 A1 * 5/2022 Pain ...................... B33Y 10/00

FOREIGN PATENT DOCUMENTS

CN 106990114 A 7/2017
CN 109414936 A 3/2019
CN 109732918 A 5/2019
FR 3063660 A1 9/2018
WO 2018017096 A1 1/2018
WO 2019246308 A1 12/2019
WO 2020093028 A1 5/2020

OTHER PUBLICATIONS

International Search Report and Written Opinion, PCT Application No. PCT/EP2021/073761, mailed Nov. 26, 2021 (13 pages).
Office Action issued by Chinese Intellectual Property Office on Jul. 9, 2025.

* cited by examiner

IN-SITU MONITORING OF ADDITIVE MANUFACTURING

This application is a 371 national stage application of International Application No. PCT/EP2021/073761, filed Aug. 27, 2021, which claims the benefit of the filing date of U.S. Provisional Application No. 63/070,904, filed Aug. 27, 2020, the contents of which are herein incorporated by reference.

FIELD OF THE INVENTION

The invention relates to a method and a system for monitoring an additive manufacturing process.

BACKGROUND OF THE INVENTION

Several layer-wise additive manufacturing (AM) techniques exist today. Among others Fused Deposition Modeling (FDM) is a common layer-wise 3D-printing technique. With FDM, a thermoplastic or thermosetting material filament (e.g., comprising a plastic or metal) is melted inside a chamber, called the hot-end, and extruded out of a nozzle onto a build-plate or onto previously extruded material. This way, a part can be built up line-per-line, layer-by-layer. This technology offers an inexpensive fabrication method with a large freedom of achievable geometries and used materials.

SUMMARY OF THE INVENTION

As FDM printers continue to advance, the quality of prints has continually improved. However, quality monitoring of the printing process and product is limited in current FDM processes. Often, the quality of the product is merely determined on the finished product.

The layer-wise fabrication process of FDM may introduce anisotropic material properties, by improper fusion between layers and between lines. These anisotropic properties can affect the physical properties of a part, whether that is for example mechanical, electrical or thermal properties.

To monitor printing quality and to distinguish the effect of printing parameters on print properties, one can monitor the printing process. Several in-situ techniques exist for quality monitoring in FDM printing. Existing techniques among others based on optical scanning, computer vision, acoustics, vibrations, strain, rheological and thermal measurements. Prior art methods are mostly rather complex and/or only provide segmented/partial information. Most prior art methods only provide information as measured on the surface. Moreover, with most prior art methods it is impossible to analyze/monitor the quality on the inside of a print.

Normally, FDM printing works in open-loop. A relevant disadvantage of present 3D printing may be the trade-off between speed and precision: if fast printing is desired in additive manufacturing, it is more difficult to know what physically happens with the deposition, and increasing speed is at the cost of precision. This is mostly due to the fact that the deposition process is basically in open-loop. On the basis of characterization of the material and conditioning of the environment like temperature control, the extruding head is moved over the surface and the extrusion is activated without having any feedback of the process in real-time.

Fused deposition modeling (FDM) and Direct Ink Writing (DIW) are additive manufacturing technologies commonly used for modeling, prototyping, and production applications.

FDM works on an "additive" principle by laying down material in layers; a plastic filament or metal comprising wire may be unwound from a coil and supplies material to produce a product or part. Essentially, (for thermoplastics for example) the filament may be melted and extruded before being laid down. In the process, the material is normally fed into the hot-end of the device as a filament. Other terms for FDM are "fused filament fabrication" (FFF) or "filament 3D printing" (FDP), which are considered to be equivalent to FDM. Moreover, the material may in further embodiments comprise pellets and/or particles, and herein the term "FDM" may further relate to Fused Pellet Fabrication and/or Fused Particle Fabrication or Fused Granular Fabrication (FGF). In general, FDM printers use a thermoplastic filament or pellets, which is heated to its melting point and then extruded, line-by-line, layer-by-layer, to create a three-dimensional object.

Material to be printed may often be conductive, such as a conductive polymer or a metal. It may therefore be suggested to monitor the printing process based on electrical properties of the product being manufactured during printing.

Electrically conductive filaments may be made from conductive polymer composites, where a polymer has a filler of conductive nano-particles (e.g. carbon black or carbon nanotubes). These materials typically have a highly resistive nature. Conductive polymer composites are for instance used for the mechanical, thermal or electrostatic dissipative nature of these materials. Additionally, or alternatively, conductive material may be added to non-conductive polymers to enable monitoring the electrical properties during processing. Direct Ink Writing (DIW) is another AM techniques that resembles FDM in that also material is deposited to form a 3D product. The material that is deposited may especially be a (viscoplastic) printable paste or ink instead of a molten polymer. Both DIW and FDM are embodiments of 3D printing.

Hence, it is an aspect of the invention to provide an alternative system for additive manufacturing, which preferably further at least partly obviate(s) one or more of above-described drawbacks. It is a further aspect of the invention to provide an alternative method for monitoring, and especially controlling, an additive manufacturing process of a product, which preferably further at least obviate(s) one or more of above-described drawbacks. The present invention may have as object to overcome or ameliorate at least one of the disadvantages of the prior art, or to provide a useful alternative.

In a first aspect, the invention provides a system for additive manufacturing of a product from a depositable material, especially wherein the depositable material is electrically conductive. In specific embodiments, the system comprises a support element. In further embodiments, the system comprises a material addition system. In specific further embodiments, the system comprises at least two electrodes. The support element may especially be configured for supporting the product, especially the product being manufactured. Further, especially the at least two electrodes comprise one or more first electrodes, especially wherein each first electrode is, and) configured at a surface of the support element (for contacting the product). In further specific embodiments, the material addition system is configured for depositing the depositable material at one or more of (i) the support element and (ii) (earlier) deposited material. Especially, thereby the product may be formed. The (earlier) deposited material may comprise any deposited, especially electrically conductive, material. The (earlier) deposited material may in embodiments comprise earlier deposited depositable material, especially depositable material that was (already) deposited prior to depositing the (present) depositable material. Further, especially any one of the (at least two) electrodes (i.e., each single electrode) may be configured for (directly and/or physically and) electrically contact the depositable material (being deposited), especially during depositing the depositable material (at the support element and/or the deposited material). Additionally, or alternatively, any one of the (at least two) electrodes (i.e., each single electrode) may be configured for (directly and/or physically and) electrically contacting the (earlier) deposited material, especially during depositing the depositable material (at the support element and/or the deposited material). Especially, the depositable material being deposited in combination with at least a portion of the (earlier) deposited material (being) arranged between (and contacting) the (respective, i.e. the respective one of the any one of the electrodes) electrode and another one of the (at least two) electrodes define an electrically conductive path. Additionally, or alternatively, at least a portion of the (earlier) deposited material arranged between the (respective, i.e. the respective one of the any one of the electrodes) electrode and another one of the (at least two) electrodes define the (or a further) electrically conductive path, especially wherein both (the respective one and the other one) are first electrodes.

In a further aspect, the invention provides a method for monitoring (and optionally controlling) an additive manufacturing process of a product. In specific embodiments, the additive manufacturing process comprises a layer-wise additive manufacturing process. Further, especially, the method comprises an in-situ method, especially an on-line method. The method may in specific embodiments comprise an in-situ, especially, an on-line (real-time) method for monitoring an additive manufacturing process of a product. In further specific embodiments, the method comprises providing a system for additive manufacturing of the product. The system (for additive manufacturing the product) may especially comprise the system for additive manufacturing (the product) described herein. In specific embodiments, the system comprises a support element, a material addition system, and especially at least two electrodes. Further, especially, the (at least two) electrodes comprise one or more, especially more, first electrodes, configured at a surface of the support element. In further embodiments, the method comprises providing depositable material to the material addition system, especially wherein the depositable material comprises electrically conductive depositable material. The method further, especially, comprises depositing, especially layer-wise depositing, the depositable material (with/using the material addition system) at one or more of the support element and (earlier) deposited material (at the support element), especially thereby forming a product). Further, especially, the method comprises measuring (with a measuring system) one or more of an electrical impedance and a resistance between any one of the electrodes and another one of the electrodes through an electrically conductive path, especially during depositing the depositable material. The electrically conductive path may in embodiments be defined in depositable material being deposited in combination with at least a portion of deposited material (together being) (arranged) between the respective electrode (especially the 'respective one' of the 'any one of the' (at least two) electrodes) and the other (of the at least two) electrode. Additionally, or alternatively, the (or a further) electrically conductive path may be defined in at least a portion of the deposited material (arranged) between the respective electrode and the other (of the at least two) electrode, especially wherein the respective electrode and the other electrodes are both first electrodes.

Hence, it is an aspect of the invention to provide, in embodiments, an, especially electrical impedance measurement, set-up integrated in a layer-wise additive manufacturing machine (e.g. Fused Deposition Modeling printer, or Direct Ink Writer/Direct Ink Writing 3D-printer) allowing to perform in-situ measurements. To accurately measure the impedance of the sample through the volume, electrodes may contact the (surfaces of the) printed sample at several places. Moreover, in embodiments, also an electrode may be arranged for contacting the material that is being deposited, and one or more further electrodes may be arranged for contacting the printed sample.

By measuring the impedance of the conductive material during printing, the changes in resistance with added layers, the contact resistance between layers and the effect of the printing parameters may e.g. be measured. In specific embodiments a multiplexed number or grid of electrodes integrated into the support element may be used in combination with a nozzle (also) being used as electrode. Using such embodiment, the impedance of the conductive body can be measured with these electrodes and a (tomographic) (3-dimensional) image of the impedance can be formed.

Further, electrical impedance measurements with the nozzle and/or a further probe (acting as electrode(s)) and a single electrode or a plurality/grid of electrodes in the support element can be used to measure the impedance distribution during printing. This allows for measurements on a wide variety of 3D-print geometries, with a high resolution. It further allows measuring over a large number of stacked (deposited layers), independently of the relative dimensions of the product (e.g. wherein a largest dimension is determined by the number of layers, or wherein the largest dimension is perpendicular to the stack of deposited layers). The method and system may define an electrically conductive path from the nozzle or probe electrode to the support element which may provide a large sensitivity in the regions far away from the support element.

Further, 3D-printers may use a second material as support structure/scaffolds for printing geometries with large overhangs or difficult geometries. These support materials are often soluble, to enable easier removing of the support structure after printing. Such scaffolds may easily be identified using the method described herein.

Further, in embodiments, the impedance may be measured. The impedance consists of a resistance and capacitance component. The impedance may further comprise an inductance component. Using both components may provide valuable information. The resistance e.g. is determined by the paths the current takes. This enables measuring things like small defects, layer-to-layer adhesion, contact loss between printer and print and loss of material extrusion (e.g. for FDM and DIW).

The method and system may provide information on geometry, bonding, temperature and e.g. defects during manufacturing. Furthermore, the method provides a fast measurement and analysis that may be easily interpreted and modelled. Based on the measurement, the manufacturing process may in embodiments be controlled. The method may e.g. comprise a closed-loop manufacturing process, especially using measured values as a feed-back to direct the process. Based on this feed-back, defects in the process and in the product being manufactured may be minimized compared to prior art solutions.

Hence, the invention provides, in embodiments, a system for additive manufacturing of a product from a depositable material, wherein the depositable material is electrically conductive, wherein the system comprises a support element, a material addition system, and at least two electrodes; wherein (i) the support element is configured for supporting the product (being manufactured), (ii) the at least two electrodes comprise one or more first electrodes configured at a surface of the support element (for contacting the product and/or (earlier) deposited material); (iii) the material addition system is configured for depositing the depositable material at one or more of (iiia) the support element and (iiib) (earlier) deposited material, especially thereby forming the product; (iv) any one of the (at least two) electrodes is configured for (iva) (directly/physically and) electrically contacting the depositable material being deposited or (ivb) (directly/physically and) electrically contacting the (earlier) deposited material, (during depositing the depositable material, wherein (ivc) the depositable material being deposited in combination with at least a portion of the (earlier) deposited material arranged between the (respective) electrode (or 'said electrode') and another one of the (at least two) electrodes define an electrically conductive path or (iivc) at least a portion of the (earlier) deposited material arranged between the (respective) electrode (or said electrode) and another one of the (at least two) electrodes define the electrically conductive path.

The system may especially be used for layer-wise additive manufacturing techniques with conductive materials.

The system and the method described herein may especially be explained based on FDM, yet in embodiments the invention also relates to other added manufacturing (AM) techniques, such as direct ink writing (DIW).

As indicated above, the method comprises depositing the depositable material. Herein the term "depositable material" refers to material to be and/or being deposited or printed. The term "deposited material" refers to material after depositing. These materials may be essentially the same, as the depositable material may especially refer to the material in a printer head/nozzle or extruder and the deposited material refers to the same material, but in a later stage when deposited. The depositable material may be printed as a filament and deposited as such. The depositable material may further comprise a viscous, especially viscoplastic, paste or liquid that may in embodiments be directly printed (using e.g. direct ink writing techniques). The depositable material may be provided as filament, may be formed into a filament, or may comprise a viscous, especially viscoplastic, paste or liquid, herein also referred to as "(printable) ink". The depositable material may be deposited as described above. Herein, also the terms like "printing" or extruding" may be used to refer to depositing. Further, the deposited material and/or the product may be referred to as "the print".

The term "extrudate" may be used to define the depositable material downstream of the material addition system (such as the nozzle), especially being deposited (during depositing), but not yet completely deposited. The latter is indicated as "deposited material". In fact, the extrudate comprises depositable material, as the material is not yet deposited. Upon deposition of the depositable material or extrudate, the material is thus indicated as depositable material. Essentially, the materials are the same material, as the material in and upstream of the material addition system, and when deposited, is essentially the same material. Yet, the material may change phase (for instance from molten to solid, or e.g. the material may set or form cross-links after depositing)

The terms "upstream" and "downstream" relate to an arrangement of items or features relative to the propagation of the items or features from a generating means generating the item or features (here especially the material addition system), wherein relative to a first position within a track or (extruded) line or layer of material provided by the generating means (the material addition system), a second position in the track or line or layer closer to the generating means (material addition system) is "upstream", and a third position within the track or line or layer further away from the generating means is "downstream".

As discussed above, the method may relate to Fused Deposition Modeling (FDM), often also referred to 3D printing. FDM may especially use a nozzle (as generating means) to extrude or print molten material onto a support element or "build plate" line-by-line and layer-by-layer to build up a print or product. The depositable material may in embodiments comprise a material that may be melted and deposited or 3D printed with the material addition system (and may solidify downstream from the material addition system). Such type of material may herein also be indicated as "3D printable material", and may e.g. comprise a thermoplastic material, or a polymeric material.

Herein the term "depositable material" may refer to a single material, such as a single polymeric material, but may also refer to a plurality of different materials, such as a plurality or mixture of different polymers (or other depositable materials).

In further embodiments, the method may relate to Direct Ink Writing (DIW). This print technique may essentially work the same as FDM but uses a viscous paste or viscous ink. The ink may be deposited by extruding the ink from (a nozzle of) the material addition system. To extrude these, the material addition system may comprise e.g. a syringe or pump extruder. Hence, in further embodiments, the depositable material may comprise a printable ink. Also the printable ink may be indicated as "3D printable material". The 3D printable material may in embodiments comprise a printable ink.

Hence, in embodiments, the system comprises a fused deposition modeling system (FDM) (or fused filament fabrication system, fused pellet fabrication/fused particle fabrication system) (especially a "3D printer"), especially wherein the material addition system is configured to melt the depositable material being deposited. In further embodiments, the system comprises a direct ink writing system, especially a direct ink writer. The direct ink writer may be an embodiment of the 3D printer.

Further, especially, in embodiments the material addition system comprises a deposition device, especially a nozzle, for (line-by-line) layer-wise depositing the depositable material at one or more of the support element and the deposited material.

Herein the terms "deposition device" and "nozzle" may refer to a plurality of (different) deposition devices or nozzles. In embodiments, e.g. the material addition system comprises a plurality of nozzles for depositing a plurality of depositable materials. In further embodiments, the nozzles may have a different size and the respective depositable materials may be the same or may have a different composition. In further embodiments, the deposition device may comprise a plurality of nozzles.

The depositable material may especially be deposited directly (to direct contact) or indirectly (on deposited material contacting) on the support element. The support element may in embodiments have a flat surface. In further embodiments, the support element may be curved. Essentially, the support element may have any arbitrary shape, as long as it is able to support the product. The support element may further comprise a support structure or scaffolds for printing geometries with large overhangs or difficult geometries. In embodiments, the scaffolds may be configured at the surface of the support element. Additionally or alternatively, a surface of the scaffolds may also define a part of the surface of the support element. The phrases like "depositing the material at the support element" especially relate to providing (such as depositing/printing) the material on (top of) the support element. Further, the support element may in embodiments comprise a build plate. Especially a temperature of the support element, especially the build plate, may be controllable.

Hence, the term "depositable material", especially "polymeric material" may also refer to a combination of two or more materials. In general, the depositable (polymeric) materials have a glass transition temperature $T_g$ and/or a melting temperature $T_m$. The depositable material may be heated by the material addition system before it leaves the material addition system (the nozzle) to a temperature of at least the glass transition temperature, and in general at least the melting temperature. Hence, in a specific embodiment the depositable material comprises a thermoplastic polymer having a glass transition temperature ($T_g$) and/or a melting point ($T_m$), and the material addition system action comprises heating the depositable material above the glass transition and if it is a semi-crystalline polymer above the melting temperature. The glass transition temperature is in general not the same thing as the melting temperature. Melting is a transition which occurs in crystalline polymers. Melting happens when the polymer chains fall out of their crystal structures, and become a disordered liquid. The glass transition is a transition which happens to amorphous polymers; that is, polymers whose chains are not arranged in ordered crystals, but are just strewn around in any fashion, even though they are in the solid state. Polymers can be amorphous, essentially having a glass transition temperature and not a melting temperature or can be (semi) crystalline, in general having both a glass transition temperature and a melting temperature, with in general the latter being larger than the former. The glass temperature may e.g. be determined with differential scanning calorimetry. The melting point or melting temperature can also be determined with differential scanning calorimetry.

Materials that may especially qualify as depositable materials (3D printable materials) may be selected from the group consisting of metals, glasses, thermoplastic polymers, silicones, etc. Especially, the depositable material comprises a (thermoplastic) polymer selected from the group consisting thermoplastic polyurethane (TPU), poly lactic acid (PLA), and Polyether ether ketone (PEEK). A further list of polymers that may be comprised by the depositable material comprises e.g. ABS (acrylonitrile butadiene styrene), Nylon (or polyamide), Acetate (or cellulose), PLA (poly lactic acid), terephthalate (such as PET polyethylene terephthalate), Acrylic (polymethylacrylate, Perspex, polymethylmethacrylate, PMMA), Polypropylene (or polypropene), Polycarbonate (PC), Polystyrene (PS), PE (such as expanded-high impact-Polythene (or polyethene), Low density (LDPE) High density (HDPE)), PVC (polyvinyl chloride) Polychloroethene, such as thermoplastic elastomer based on co-polyester elastomers, polyurethane elastomers, polyamide elastomers polyolefine based elastomers, styrene based elastomers, etc.

The depositable material may further comprise a printable ink. The printable ink may especially comprise a high viscoplastic slurry or liquid. The printable ink may especially comprise a shear-thinning yield stress fluid. The printable ink may be selected for to not spontaneously flow from the material addition system/nozzle and/or on the support element, yet allowing the material to flow when being extruded through a nozzle. The printable ink may in embodiments have a yield stress in the range of 20-400 Pa. In further embodiments, the printable ink may have a storage modulus in the range of $1*10^3$-$2*10^5$ Pa.

The printable ink may especially comprise a granular or particulate material. The printable ink may comprise particles. In embodiments, the particles may have a number average particle size in the range of 1 nm-250 μm, such as in the range of 1 nm-100 μm, especially 1 nm-50 μm. In embodiment, e.g. the conductive material in the printable ink (or in the depositable material used for FDM) may be smaller than 1 μm, such as smaller than 100 nm, especially smaller than 10 nm, e.g. around 5 nm. In embodiments, the particles may comprise a material selected from the group consisting of a polymer, a glass, a ceramic, and a metal. In further embodiments, the particles may (further) comprise an organic material, e.g. wood or another organic cell structure, especially an edible organic material (e.g. for preparing a food product). The material may e.g. comprise a natural or a synthetic polymer and/or polymer network, especially a hydrogel.

Hence, in embodiments, the depositable material, especially the printable ink, even more especially the particle, comprise a material selected from the group consisting of a polymer, a glass, a ceramic, and a metal. In specific embodiments, the particles comprise a natural or a synthetic polymer and/or polymer network, especially a hydrogel. In specific embodiments, the particles comprise a hydrogel, especially are hydrogel particles.

Hydrogels and/or hydrogel particles may e.g. comprise one or more of (the compounds or solutes) agarose, agarose collagen conjugate, alginate, acrylate, gelatin, collagen, chitosan, poly-ethylene glycol, polyethylene glycol (PEG), and poly vinyl alcohol (PVA).

In embodiments, the depositable material is self-supporting. The printable ink may in further embodiments be shear-thinning, especially allowing to print the material. Further, the printable ink may be self-supporting before and after depositing. The term "printable ink" in relation to DIW is known to the skilled person and especially relates to an extrudable synthetic or biological material or a mix of both.

Further, especially, the depositable material may be electrically conductive based on the material properties of the material as such. The depositable material may e.g. comprise an electrically conductive polymer, an electrically conductive metal, or an electrically conductive printable ink. Additionally, or alternatively, an electrically conductive material may be mixed with the material to provide an electrically conductive material. In embodiments, a filler of conductive nano-particles (e.g. carbon black, graphene, carbon nanotubes, or metal nano particles, such as comprising copper, iron, or any other conductive metal) may be comprised by the depositable material, such as the polymeric material or the printable ink. In embodiments, e.g. the depositable material may comprise conductive TPU, e.g. comprising carbon black, or conductive PEEK (e.g. comprising carbon nano particles). In further embodiments, the depositable material may comprise conductive PLA, e.g. comprising one or more of carbon black and copper nano particles.

These materials typically have a highly resistive nature.

The electrical conductivity may essentially relate to a type or composition of the material. The electrical conductivity may further be a function of the temperature of the material. For instance, conductive polymer composites may exhibit a positive temperature coefficient approximately up to the melting temperature, indicating that the material experiences an increase in resistance upon an increase in their temperature.

The depositable material may in embodiments comprise an electrically conductive polymer composite. In further embodiments, the depositable material comprises an electrically conductive printable ink composite. The depositable material may especially comprise a combination of one or more materials described herein in relation to the depositable material. Further, as described above, the depositable material is especially electrically conductive. The depositable material may especially conduct electricity, an electric current. Especially, electrons may propagate through the depositable material and through the deposited material based on an electrical potential difference (also indicated as “potential difference”, electrical potential” or simply “potential”) imposed over the (at least part of) the—depositable and deposited—material. An electrical potential difference may especially be provided between (two respective) electrodes. Based on the imposed electrical potential electrons may flow through at least a part of the electrically conductive material arranged between the electrodes (and contacting the electrodes). Essentially, the electrons may flow through locations of the material having a relatively high electric conductivity (compared to other locations of the material), and especially electrons may avoid locations with reduced conductivity. Yet, it may be understood that if the only path may be through material having a high electrical resistance, the electron may still flow this way. Further if a highly conductive portion of the material is enclosed by a relatively low conductive portion, the favorable path may not always path the highly conductive portion. Essentially, the path may be a result of the entire continuum. Herein a preferred (electrically conductive) path/pathway or e.g. trajectory for the electrons between the electrodes, may also be indicated with the electrically conductive path (being defined between the electrodes). The electrically conductive path may deviate from a shortest path between the electrodes (because of changes in conductivity). The electrically conductive path, further, may change in width (perpendicular to a direction of the electrically conductive path. For instance, if the electrically conductivity of the material between the electrodes is very homogeneously distributed, the path may essentially occupy substantially all the material between the electrodes. Yet, when there is only a small portion of the material that is much more conductive than the remainder of the material (and may define a continuous path), the electrically conductive path may occupy only a small fraction of all the material. The electrically conductive path may especially have any arbitrary shape (or volume). Especially at least part of the material between the electrodes comprises the electrically conductive path.

Herein terms like “conductivity” and “conductive” especially refer to the electrical conductivity. Further, the term “electrically conductive path” may refer to a plurality of (different) electrically conductive paths between one electrode and another electrode, as well as e.g. between the one electrode and a further electrode, or between two further electrodes (of the system). For instance, in embodiments, the impedance and/or resistance between two locations of the support element may be measured through a (first) conductive path starting at a first location of the support element and ending at another location of the support element, and a further impedance and/or resistance between a locations of the support element and a location of the material addition system may be measured through a (second) conductive path starting at the location of the support element and ending at the location of the material addition system.

For instance, a resistance may be measured/determined by providing a direct current to one of the electrodes (and measuring a voltage drop). Yet also the impedance between the electrodes may be measured. The measurement of impedance especially requires the measurement of the magnitude of voltage and current, and the phase difference between them. In embodiments, an AC current is provided, and the voltage magnitude and phase shift are recorded. Yet, alternatively a voltage may be provided, and a current may be measured. In embodiments, an alternating current may be provided to the one of the electrodes and another one of the electrodes. The measurement may comprise electrical impedance spectroscopy. The measuring system (see further below) may in embodiments comprise a multimeter or an LCR meter to measure one or more of the voltage, the resistance, the impedance, the resistance, and the current. Yet, also other types of measuring devices, known in the art, may be used. The impedance and the resistance may change during depositing. Hence, the measuring, especially, comprises repeatedly measuring. Further, in embodiments, measuring the impedance may relate to measuring an impedance spectrum. The measuring may further comprise selecting one or more frequencies for measuring the impedance, especially allowing to separate the resistance capacitance and inductance data.

In embodiments, the system is configured for measuring the impedance and/or resistance between the material addition system, especially the deposition device, even more especially the nozzle, and the support element. In further specific embodiments the (at least two) electrodes comprise a second electrode comprised by the material addition system, wherein the second electrode is configured for contacting the depositable material being deposited. In further specific embodiments, the deposition device, especially the nozzle comprises the second electrode. In such embodiments, the depositable material (being deposited) in combination with at least the (a) portion of the deposited material contacting the first electrode, especially a respective first electrode (of the one or more first electrodes), define the electrically conductive path (defined) between the second electrode and the (respective) first electrode (of the optionally more than one electrically paths).

The term “second electrode” may refer to a plurality of second electrodes. For instance, in embodiments, the system may comprise a plurality of nozzles (and/or deposition devices), and especially each nozzle (deposition device) may comprise or be functionally connected to a (respective) second electrode. During depositing (depositable material) one or more of the second electrodes may define a respective electrically conductive path, whereas other second electrodes temporarily not depositing material may not be part of a conductive path, but especially will define a respective conductive path if depositing material.

Additionally, or alternatively, the system comprises a plurality (at least two) of first electrodes. In such embodiment, at least the portion of the deposited material contacting any one of the first electrodes and another one of the first electrodes may define the (further) electrically conductive path between the respective first electrode and the other one of the first electrodes.

The term “plurality of first electrodes” may refer to at least 2, such as at least 4, especially at least 8, even more especially at least 16, such as at least 32, or even more first electrodes. In embodiments, e.g., the system may comprise more than 100, or even more than 200 electrodes, such as even more than 10000 electrodes. In embodiments, the system may comprise at maximum 10000, such as at maximum 1000, such as at maximum 500, especially at maximum 128 electrodes. The first electrodes are especially configured at the surface of the support element (for contacting the product/deposited material).

Hence, in further embodiments, the surface of the product support defines a network of (a plurality of) the first electrodes. The network may in further embodiments comprise an array of n*m first electrodes, for instance with $1 \leq n \leq 500$, especially $2 \leq n \leq 500$, such as $2 \leq n \leq 100$, and especially $1 \leq m \leq 500$, especially $2 \leq m \leq 500$, such as $2 \leq m \leq 100$. The array may define a grid of (first) electrodes. The first electrodes may be evenly distributed over the surface of the support element. Yet in further embodiments, the distribution may be rather random, or e.g. more or less focused on locations on the edge of the product, or other locations of the product that may require extra monitoring. Further, in embodiments the product may have a circular surface contacting the support element, and the network or grid may e.g. also have a circular shape. In further embodiments, the product may have an irregularly shaped surface contacting the support element, and the network or grid may e.g. have a similar irregular shape.

The system may in further embodiments (be connected to or) comprise a measuring system (functionally coupled to the (at least two) electrodes and) configured for measuring one or more of an impedance and a resistance through one or more of the electrically conductive paths.

Hence in embodiments, the system may comprise at least three electrodes, such as at least three first electrodes, and/or at least 2 first electrode and the second electrode. In further embodiments, the measuring system (further) comprises a multiplexer system functionally coupled to the (at least three) electrodes, especially for multiplexing the electrodes. The system may e.g. be configured for (sequentially) measuring the one or more of the impedance and the resistance between pairs of selected electrodes of the (at least three) electrode, especially through the respective electrically conductive path defined between the electrodes of the pairs (or respective pair) of electrodes, especially wherein the selected electrodes of each pair are functionally coupled to each other by the multiplexer system (when measuring between the respective pair of electrodes).

Hence, the system may in embodiments be configured for 3-dimensional measurements. The measurements between different pairs of electrodes may especially enable obtaining tomographic impedance information, giving insight throughout the print/product.

The system may, in further embodiments, further comprise a control system. The control system may, in embodiments, be configured for determining a characteristic of the manufacturing process and/or of the product being manufactured, especially (among others) based on a signal of the measuring system. The control system may especially be functionally coupled to the measuring system. Additionally, or alternatively, the control system may be functionally connected to the material addition system and/or other elements of the system, such as the support element.

The control system is in further embodiments, especially configured for controlling an operating condition (or "parameter") of the system (or the manufacturing process). Controlling the operating condition may e.g. be based on one or more of the determined characteristics. The operating condition (or parameter) may e.g. comprise a flow of the depositable material being deposited by the material addition system (a flow through the nozzle) and/or a temperature of (especially the nozzle of) the material addition system, The operating parameter may further comprise a movement of the material addition system relative to the support element, such as a direction or speed of the nozzle (or a direction or speed of the support element). The operating condition (parameter) may further comprise a distance of the material addition system, especially the nozzle, relative to the support element and/or relative to the deposited material (especially a shortest distance between the nozzle and the deposited material and/or the support element). Additionally or alternatively the control system may control a temperature of the surface of the support element and/or a temperature of a space comprising the system. In embodiments, the operating condition (parameter) comprises one or more operating conditions (parameters) selected from the group consisting of a flow of the depositable material being deposited by the material addition system, a temperature of (a nozzle of) the material addition system, a movement of the material addition system relative to the support element, a temperature of the surface of the support element, a temperature of a space comprising the system.

In further embodiments, the operating conditions may relate to controlling a cooling fan to cool the nozzle and/or deposited material. the operating conditions may further relate to an actuation (or controlling) of the material addition device, e.g. to stop or start printing (via the nozzle or a specific nozzle of the plurality of nozzles). The flow of the depositable material being deposited may in embodiments relate to an extrusion multiplier. The term "extrusion multiplier" specially relates to under or over extruding an amount of the depositable material relative to a theoretically ideal amount of the depositable material.

Hence, in embodiments, the system comprises a closed-loop control system, especially using measured signals from (between) the electrodes to adjust certain parameters in the printing process in real-time. The closed-loop control system may be used to reduce defects in the product or process, such as contact loss between the depositable material and the deposited material, warping (i.e. deforming of the deposited material/product especially due to heat, causing it to peel off from the support element and losing contact), an uncontrolled shift of successively deposited layers relative to each other, no material extrusion, a bad adhesion between successive layers. The closed-loop control may be used to provide a reproducible manufacturing process and product.

Hence, in embodiments, a characteristic of the manufacturing process and/or of the product being manufactured may be determined (especially (among others) based on a signal of the measuring system). The characteristic may especially be calculated from measured impedance and/or resistance data, especially through different electrically conductive paths, and/or over different portions of the depositable material, the deposited material and/or the product (during depositing). The characteristic may comprise a material property of the deposited material, such as a resistivity, a permittivity, and a thermal properties. The characteristic may especially relate to the characteristic of the manufacturing process.

The characteristic may e.g. comprise one or more characteristics selected from the group consisting of a temperature of the depositable material being deposited, a (local) temperature of the deposited material, an (3D) impedance profile over a combination of the depositable material being deposited and deposited material, an (3D) impedance profile over deposited material, a (3D) temperature profile over deposited material, a defect in the product being manufactured, a functioning of the material addition system, a functioning of the support element, an amount of depositable material being deposited, a bonding between depositable material being deposited and one or more of the support element and the deposited material, a (electrically conductive) contact loss between the depositable material and the deposited material, a location of the material addition system relative to the support element, and a material properties of the deposited material.

As described above, the invention further provides, in embodiments, a method for (in-situ) (on-line) monitoring an additive manufacturing process of a product, especially a layer-wise additive manufacturing process, wherein the method comprises: (i) providing a system for additive manufacturing of the product (especially the system described herein), wherein the system comprises a support element, a material addition system, and at least two electrodes, wherein the (at least two) electrodes comprise one or more first electrodes, (wherein each first electrode is) configured at a surface of the support element; (ii) providing depositable material to the material addition system, wherein the depositable material comprises electrically conductive depositable material; and (iii) (layer-wise) depositing the depositable material (with the material addition system) at one or more of the support element and (earlier) deposited material (at the support element), (thereby forming a product) while measuring (with a measuring system) one or more of an electrical impedance and a resistance between any one of the electrodes and another one of the electrodes through an electrically conductive path being defined in (iiia) depositable material being deposited in combination with at least a portion of deposited material (together) (arranged) between (and contacting) the respective electrode and the other electrode and/or defined in (iiib) at least a portion of the deposited material (arranged) between (and contacting) the respective electrode and the other electrode.

The method may especially be used for layer-wise additive manufacturing techniques with conductive materials. The method is especially configured for real-time monitoring (and controlling) the printing process.

In embodiments, the method may comprise measuring the impedance and/or resistance between two first electrodes, especially wherein the system comprises at least two first electrodes. Additionally, or alternatively, the (at least two) electrodes comprise a second electrode comprised by the material addition system, wherein the second electrode contacts the depositable material being deposited, and especially wherein the method at least comprises measuring one or more of the electrical impedance and the resistance between the second electrode and one or more first electrodes through the respective electrically conductive path defined in depositable material being deposited in combination with at least the portion of deposited material between (and contacting) the second electrode and the respective one of the one or more first electrodes.

In further embodiments, the system comprises a plurality of nozzles each comprising a second electrode, and the method may comprise selecting at least one of the nozzles and depositing the depositable material via the at least one of the selected nozzles at one or more of the support element and deposited material. In further embodiments, the method comprises measuring at least one or more of the electrical impedance and the resistance between the second electrode comprised by the at least one of the nozzles and one or more first electrodes through the respective electrically conductive path defined in depositable material being deposited by the at least one of the nozzles in combination with at least the portion of deposited material between (and contacting) the respective second electrode and the respective one of the one or more first electrodes.

In further specific embodiments, the (at least two) electrodes comprise a plurality of first electrodes, and the method at least comprises measuring one or more of the electrical impedance and the resistance between any one of the first electrodes and another one of the first electrodes through the electrically conductive path defined in the portion of deposited material between (and contacting) the respective first electrodes. Further, the system may in embodiments comprise at least three electrodes and a multiplexer system (comprised by the measuring system), as described above. Therefore, in embodiments, the method may especially comprise (sequentially) functionally coupling a predetermined electrode to another one of the electrodes with the multiplexer system to form a pair of electrodes, and especially measuring the one or more of the impedance and the resistance between one or more pairs of electrodes through the respective electrically conductive paths defined between the electrodes of the pairs of electrodes.

Hence, in embodiments, the system may comprise the second electrode, and the method comprises a 3-dimensional measurement, especially wherein the method provides tomographic impedance information during depositing the depositable material.

According to an embodiment of the invention, there is provided a support element (build plate) with a single (first) electrode or a grid of distributed (first) electrodes, to fully contact the bottom surface of any 3D-printed sample. The (first) electrodes are multiplexed to enable measurements between different electrodes.

According to a further embodiment of the invention, there is provided a 3D-printing nozzle or probe that also serves as an electrode from the top side of the sample during printing (a second electrode). The combination of the (first) electrodes on the support element (build plate) and the nozzle as second electrode allows for improved (tomographic) measurements for conductive prints.

The method may be used for (real-time) monitoring the manufacturing process. Additionally, the method may be used to (real-time) control the manufacturing process. The method may in further specific embodiments further comprise a closed-loop control stage, especially comprising (i) determining one or more characteristics of the manufacturing process and/or of the product being manufactured based on one or more of the measured impedance and resistance; and (ii) controlling an operating condition (or parameter) of the of manufacturing process based on one or more of the determined characteristics.

The characteristic may essentially be a characteristic described in relation with the system. Likewise, the operating condition may especially comprise one or more operating conditions or parameters described herein in relation to the system.

The phrase "controlling an operating condition (or parameter) of the of manufacturing process based on one or more of the determined characteristics" may refer to first at least partly processing the characteristic(s) and controlling the operating condition based on the at least partly processed characteristic(s). The term "characteristic" may refer to a plurality of characteristics. The term may further refer to a processed characteristic.

In the closed-loop control stage, the determined characteristic(s) may be compared to characteristics (or processed characteristics) obtained during manufacturing of earlier manufactured products, or e.g. obtained by simulation of the process, or based on theory. For instance every product being manufactured may have a unique resistance signature or impedance signature, during manufacturing as well as for the final product. Basically, every similar print may be manufactured using the same printing process stages, especially giving rise to correlating/identical curves and peaks in the impedance and/or resistance measurements, which may provide a specific signature or fingerprint. The characteristic may in embodiments comprise a resistance signature and/or an impedance signature. Such signature may especially comprise a 3D signature.

The characteristics to compare with may in embodiments be obtained from a resistance signature and/or impedance signature determined during and/or after depositing an earlier manufactured product. The characteristic(s) to compare with may be obtained from instructions. In embodiments, the method may further comprise simulating the additive manufacturing process simultaneously with carrying out the manufacturing process. Such simulation may use the measured characteristics to on-line (in real time) simulate the course of the manufacturing process and may e.g. correct the process on desire. Such simultaneously simulation may also be known as a digital twin. The simulation may be carried out by the control system, or in embodiments with a simulation system functionally connected to the control system.

In further embodiments, the closed-loop control stage comprises comparing the one or more determined characteristics with model characteristics for the additive manufacturing process of the product to control the operating condition(s). Especially, the model characteristics comprises one or more of model characteristics previously obtained in the additive manufacturing process of a same product; and model characteristics provided by an online simultaneously operated simulation of the additive manufacturing process based on the determined characteristics.

The method, especially the closed-loop control stage may in embodiments be executed by the control system, and/or a data processing system (functionally coupled to the control system or comprised by the control system). The system may in embodiments comprise the data processing system.

Therefore, in a further aspect, the invention may further provide a data processing system comprising means for carrying out the closed-loop control stage of the method.

In yet a further aspect, the invention further provides a computer program product comprising instructions to cause the system (especially comprising the control system) to execute the closed-loop control stage (of the method described herein).

The system and the method of the invention enables a direct feedback to control operating conditions of the process.

The embodiments described above in relation to the connection system of the present invention, may especially also apply for the device of the invention. Further, embodiments described in relation to the devices of the invention may also apply for the method of the invention.

The term "controlling", and similar terms herein especially refer at least to determining the behavior or supervising the running of an element. Hence, herein "controlling" and similar terms may e.g. refer to imposing behavior to the (controllable) element (determining the behavior or supervising the running of an element), etc., such as e.g. measuring, displaying, actuating, opening, shifting, changing temperature, etc., especially actuating. Beyond that, the term "controlling", and similar terms may additionally include monitoring. Hence, the term "controlling", and similar terms may include imposing behavior on an element and also imposing behavior on an element and monitoring the element. The controlling of the element can be done with the control system. The control system and the (controllable) element may thus at least temporarily, or permanently, functionally be coupled. The element may comprise at least part of the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems.

The terms "functionally coupled" such as in the phrase "a first element is functionally coupled to a further element", may especially indicate that the two elements may function together. For instance a functionally coupling of two electrically conductive element may indicate that an electrical current may flow from the first element to the further element (and vice versa) a functional coupling between a control system and a further element of the system may indicate that the control system may instruct the further element and/or information may be exchanged between the control system and the further element.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1:
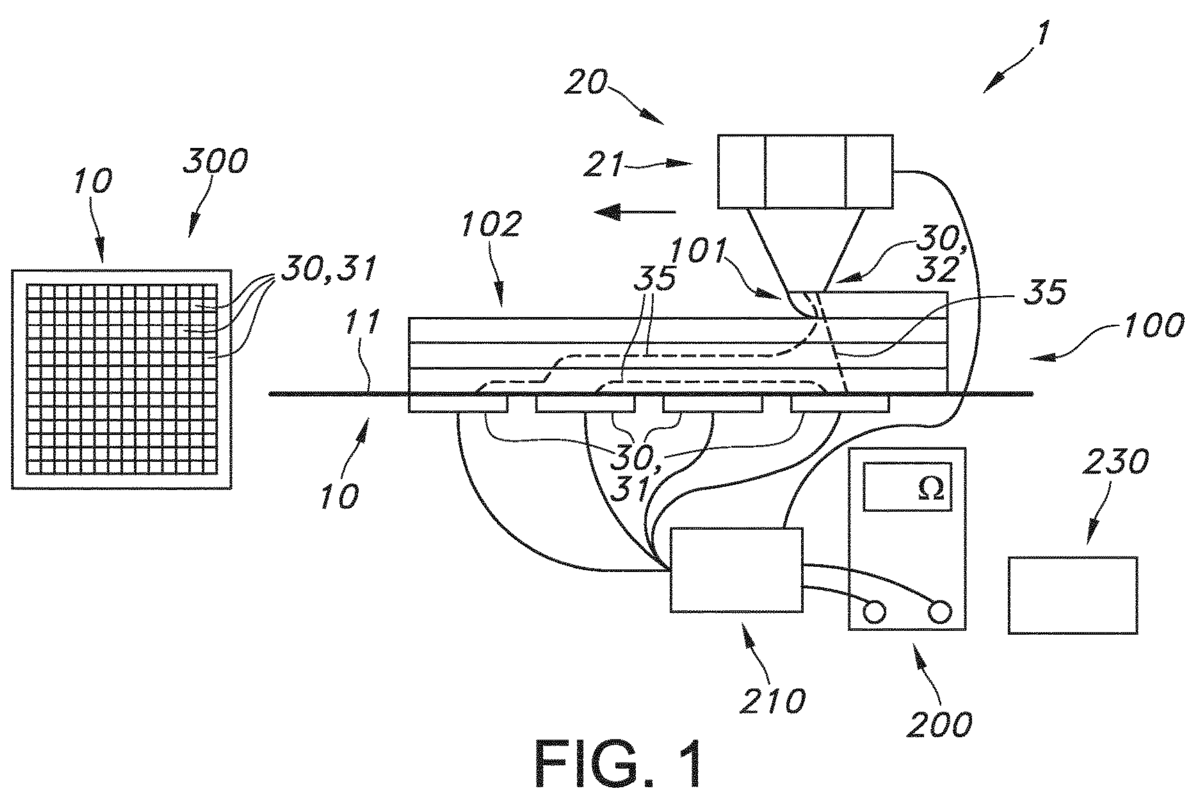
FIG. 1 schematically depicts an embodiment of the system and the method of the invention.

FIG. 1 schematically depicts an embodiment of the system 1 for additive manufacturing of a product 100 from a depositable material 101. The figure further depicts an embodiment of the method of the invention. The depicted system 1 comprises the support element 10, the material addition system 20, and a plurality of electrodes 30, especially a plurality of first electrodes 31 and a single second electrode 32. Hence, the electrodes 30 comprise one or more first electrodes 31, as described herein, especially wherein each first electrode 31 is configured the surface 11 of the support element 10 and contacts the product 100. The depositable material 101 is deposited at the earlier deposited material 102, thereby forming the 100. The support element 10 supports the product 100 (being manufactured). The material addition system 20 is essentially configured for depositing the depositable material 101 at the support element 10 and/or at the deposited material 102. The system 1 may especially comprise a fused deposition modeling system, wherein the material addition system 20 is configured to melt the depositable material 101 being deposited (not further depicted). Yet, figure may also depict a direct ink writing system. It is further noted that in embodiments (not depicted), the material addition system 20 may comprise a plurality of nozzles 21, especially each comprising a second electrode 32.

Any one of the electrodes 30 is configured for (directly/physically) electrically contacting the depositable material 101 being deposited or (directly/physically) electrically contacting the deposited material 102. Moreover each first electrode 31 directly contacts the deposited material 102 and the second electrode directly contacts the depositable material 101. Further, the depositable material 101 being deposited in combination with at least a portion of the earlier deposited material 102 arranged between a respective one of the first electrodes 31 and another one of the first electrodes 30 define an electrically conductive path 35. In the figure one of such paths 35 is depicted between the two first electrodes 31 in the center. The path is depicted as a rather smooth path and a single line. Yet, the path 35 is based on the (local) conductivity in the material 102 and may be much broader (e.g. also being comprised by more than one layer of deposited material 102 and/or may be irregular. A further electrically conductive path 35 is indicated between one of the first electrodes 31 and the second electrode 32 or nozzle 21. This path 35 is especially defined by a combination of at least a portion of the (earlier) deposited material 102 and the depositable material 101, being deposited, (together) arranged between theses electrodes 31, 32. In embodiments comprising a plurality of second electrodes 32, such path 35 may be defined between any one of the second electrodes 32 (of a nozzle 21 that is temporarily depositing respective depositable material 101) and any one of the first electrodes 31. It is noted that if (temporarily) no material 101 is deposited by the nozzle 21 of the material addition system 20, there may also be no electrical connection between the nozzle and another electrode 30, 31.

The depicted embodiment is an example of an embodiment wherein the electrodes 30 comprise a second electrode 32 comprised by the material addition system 20, wherein the second electrode 32 is configured for contacting the depositable material 101 being deposited. As such, the depositable material 101 being deposited in combination with at least the portion of the deposited material 102 contacting a respective first electrode 31 define the electrical conductive path 35 between the second electrode 32 and the respective first electrode 31. Furthermore, the figure also depicts an example of an embodiment wherein the surface 11 of the product support 10 defines a network or an array 300 of first electrodes 31. The array 300 is depicted as a rectangular array 300 with square electrodes 30, however the system 1 is not limited to these configurations. Both the array 300 and electrodes 30 may have different geometries in practice if this is beneficial for printing certain products 100.

Herein, especially reference is made to a first electrode 31 configured at the support element 10 and a second electrode 32 e.g. configured at a nozzle 21. It is noted that in embodiments of the invention, the system 1 may further comprise a third (type of) electrode 30 configured for arranging in the deposited material 102 during deposition of further depositable material 101. Combinations of such third electrode 30 with either the first electrode 31 or the second electrode 31 may provide further electrically conductive paths 35 and may provide even further relevant information. A third electrode 30 may also be named "embedded electrode" and may in embodiments also define an electrical contact in the product 100, that e.g. can be used after fabrication as connections to sensors or especially to any electrical device (e.g. electrical circuitry, a power source, or an actuator). Likewise predetermined sensor connections in the final product 100 may in embodiments be used during manufacturing of the product 100 for monitoring.

In the embodiment, further the measuring system 200 is depicted, The measuring system is functionally coupled to the electrodes 30 for measuring one or more of an impedance and a resistance through one or more of the electrically conductive paths 35. The measuring system 200 comprises a multiplexer system 210 functionally coupled to the electrodes 30. The system 1 is especially configured for sequentially measuring the one or more of the impedance and the resistance between pairs of selected electrodes 30 through the respective electrically conductive paths 35 that is defined between the electrodes 30 of the pairs of electrodes 30. The selected electrodes 30 that are temporarily used for the measurement of each pair are functionally coupled to each other by the multiplexer system 210.

Such system may especially be used for 3-dimensional measurements. Multiplexing may enable to obtain tomographic impedance information, giving insight throughout the product 100 being manufactured.

The depicted embodiment further also very schematically depicts a control system 230. The control system 230 may be functionally coupled to the measuring system 200 (not depicted), and may especially be used for determining a characteristic of the manufacturing process and/or of the product 100 being manufactured, based on a (impedance and/or resistance) signal of the measuring system 200. Such characteristic may e.g. comprise an impedance profile over a combination of the depositable material 101 being deposited and deposited material 102, and/or an impedance profile over deposited material 102. The characteristic may further comprise information about functioning of the material addition system 20, for instance a sudden change (or no change) in a location of the material addition system 20 relative to the support element.

Based on one or more of the determined characteristics, the control system 230 may in embodiments control an operating condition or parameter of the system 1, such as the flow of the depositable material 101 being deposited, or the temperature of the nozzle 21 of the material addition system 20. Such real-time controlling of the process based on monitoring the process, is herein also indicated as a closed-loop control. Hence, the control system 230 may in embodiments also be functionally coupled to other elements of the system 1, such as the material addition system 20 and/or the support element 10. The control system 230 may comprise a plurality of control system 230 and/or sub systems or control units together defining the control system 230. Moreover, one or more of the other elements of the system, e.g. the measuring system 200, the material addition system 20, the multiplexer system 210, etc. may comprise a respective part (or control unit) of the control system 230, or may be functionally coupled to a control unit. Furthermore, in embodiments, (at least part of) the control system may be configured for measuring and/or analyzing. In further embodiments, the control system 230 may (also) be configured to control parameters of the manufacturing process.

FIG. 1 further depicts an overview of a combined set of electrodes 30 for electrical impedance measurements. FIG. 1 further also schematically depicts a lay-out of an embodiment of the electrical impedance tomography electrodes 30. With reference numbers and abbreviations certain aspects of the invention are indicated. Moreover, FIG. 1 may depict an embodiment of the system 1 comprising a multiplexed grid of electrodes in the support element 10 or build plate 10 and the nozzle 21 connected as electrode 30, especially as second electrode 32. The electrodes 30, or first electrodes 31 on the build plate 10 form a matrix. The Figure may further depict a set-up for in-situ electrical impedance (tomography) measurements in layer-wise additive manufacturing techniques (e.g. Fused Deposition Modelling printers).

Reference 100 refers to the print or product 100, which is manufactured by the 3D-printer 20. It is manufactured in a layer-wise manner and for this invention needs to be made out of a conductive material 101 (this does not necessarily have to be a conductive polymer composite, however, it needs to be conductive).

The build plate is depicted with reference 10. The print 100 is deposited onto the build plate 10 during the process. For FDM the build plate 10 usually contains a heating element to keep the print 100 at the right temperature.

The electrodes 31 are integrated in the build plate 10. They cover the surface (area) 11 of the build plate 10 on which is printed. In this way they contact the entire bottom surface of print 100.

The nozzle 21 (or further nozzle 21 or additional probe) extrudes the molten material 101 onto the build plate 10 or onto the print 100, especially the deposited material 102. It is a conductive nozzle 21 which is also connected electrically to the multiplexer 210 to enable impedance measurements. Instead of (or together with) the nozzle 21, also a separate conductive probe can be installed on the print head 21 to perform impedance measurements instead.

The first electrodes 31 and the nozzle 21 (second electrode 32) are multiplexed to enable impedance measurements between any pair of these electrodes 30. During printing this enables switching between electrode 30 pairs to measure impedance between specific electrodes 30,31 on the build plate 10 or between an electrode 30, 31 on the build plate 10 and the nozzle 21 (second electrode 32). This enables forming a tomographic image of the impedance during printing.

FIG. 1 further depicts an embodiment of the method for monitoring (and optionally controlling) an additive manufacturing process of the product 100. Such method may especially comprise providing the system 1; providing (electrically conductive) depositable material 101 to the material addition system 20; and (layer-wise) depositing the depositable material 101 with the material addition system 20 at one or more of the support element 10 and deposited material 102 while measuring one or more of an electrical impedance and a resistance between any one of the electrodes 30 and another one of the electrodes 30 (through an electrically conductive path 35 being defined in depositable material 101 being deposited in combination with at least a portion of deposited material 102 between the respective electrode 30 and the other electrode 30 and/or defined in at least a portion of the deposited material 102 between the respective electrode 30 and the other electrode 30 (especially two first electrodes 31).

In the depicted embodiment the method may at least comprises measuring one or more of the electrical impedance and the resistance between the second electrode 32 and one or more first electrodes 31 through the respective electrically conductive path 35 defined in depositable material 101 being deposited in combination with at least the portion of deposited material 102 between (and contacting) the second electrode 32 and the respective one of the one or more first electrodes 31. Furthermore, the method may also (sequentially before or after measuring between the second electrode 32 and any one of the first electrode 31) comprise measuring one or more of the electrical impedance and the resistance between any one of the first electrodes 31 and another one of the first electrodes 31 through the electrically conductive path 35 defined in the portion of deposited material 102 between (and contacting) the respective first electrodes 31. Moreover, the method may especially comprise (sequentially) functionally coupling a predetermined electrode 30 to another one of the electrodes 30 with the multiplexer system 210 to form a pair of electrodes 30, and measuring the one or more of the impedance and the resistance between one or more pairs of electrodes 30 through the respective electrically conductive paths 35 defined between the electrodes of the pairs of electrodes 30.

It is noted that the schematically depicted electrical path 35 is simplified for clarity reasons. The resistance is a distributed property, all parts of the deposited material 102 and depositable material 101 add to the resistance and may be part of the conductive path 35. Depending on a contact resistance between the layers, the main current component can flow directly between the electrodes 30 (as depicted now with the dotted lines in FIG. 1) for insignificant contact resistance and simple geometries, or might spread out over the entire sample 100 if there is a "bottleneck" for the current somewhere (for example a contact resistance/higher resistance between layers). Since all the material 101, 102 may be part of the electrically conductive path 35 to some extent (albeit insignificant for some locations), the method allows for measuring the distributed addition of material 101.

Further, using the depicted embodiment, the method may further comprise a closed-loop control stage, especially to control and/or adjust the manufacturing in real-time The closed-loop stage may especially comprise determining one or more characteristics of the manufacturing process and/or of the product 100 being manufactured based on one or more of the measured impedance and resistance; and controlling an operating condition of the manufacturing process based on one or more of the determined characteristics. The closed-loop control stage may e.g. comprise comparing the one or more determined characteristics with model characteristics for the additive manufacturing process of the product 100 to control the operating condition, such as wherein the model characteristics are previously obtained in the additive manufacturing process of a same product 100; or model characteristic provided by a digital twin that may simultaneously simulate the additive manufacturing process based on the determined characteristics.

In embodiments, the system, especially the control system 230 may comprise or be functionally coupled to a data processing system comprising means for carrying out the closed-loop control stage. Moreover, the control system 230 may be run on a computer program product comprising instructions to cause the system 1 to execute the closed-loop control stage.

In further embodiments (not depicted) the method may further comprise arranging a third (type of) electrode 30 in the deposited material 102 during depositing the depositable material 101. Especially, the method may comprise measuring one or more of the impedance and the resistance between the third electrode and any one of the other electrodes 30 (especially any one of the first electrodes 31 and the second electrode(s) 32

Figure 2:
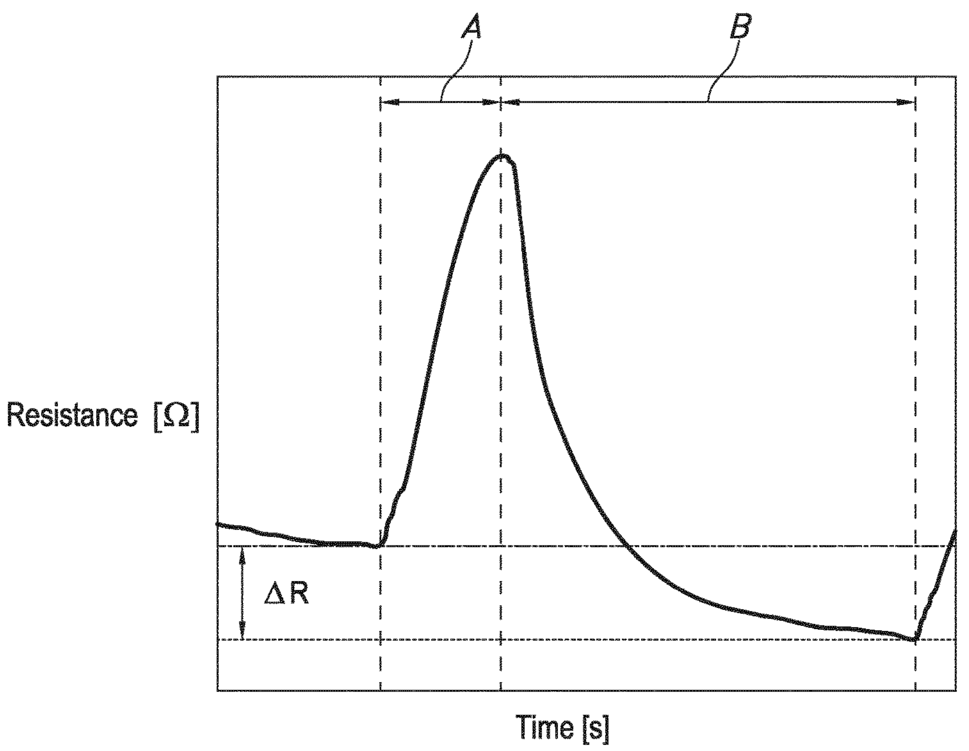
FIGS. 2-4 depict some further aspects of the method.

FIG. 2 depicts a typical resistance curve during measurements between two electrodes 30. The figure shows a resistance curve between two electrodes 30, 31 on the build plate 10 during the printing of an additional layer on top of the sample with FDM, the shape corresponds to the one depicted with the roman number I in FIG. 3. The figure may especially depict a typical measurement curve for printing of a single layer of material 102 on top of the sample with FDM. During printing the nozzle 21 and added layer 102 heat up the sample (region indicated with reference A) and therefore increase the resistance. The samples cool down (region indicated with reference B) and the resistance drops afterwards (indicated with ΔR.

During the printing phase the molten material 101 and the hot nozzle 21 heat up the sample 100, 102. Due to the positive temperature coefficient of the conductive polymer composite 101, 102 the resistance goes up because of the rise in temperature. After printing the layer 102, over time, the sample 100 cools down and the resistance drops again. The resistance can drop below the previous resistance value from before printing a new layer, since the new layer adds extra conductive pathways.

The impedance may also be measured during printing without cool-down phases to print at standard speed.

Figure 3:
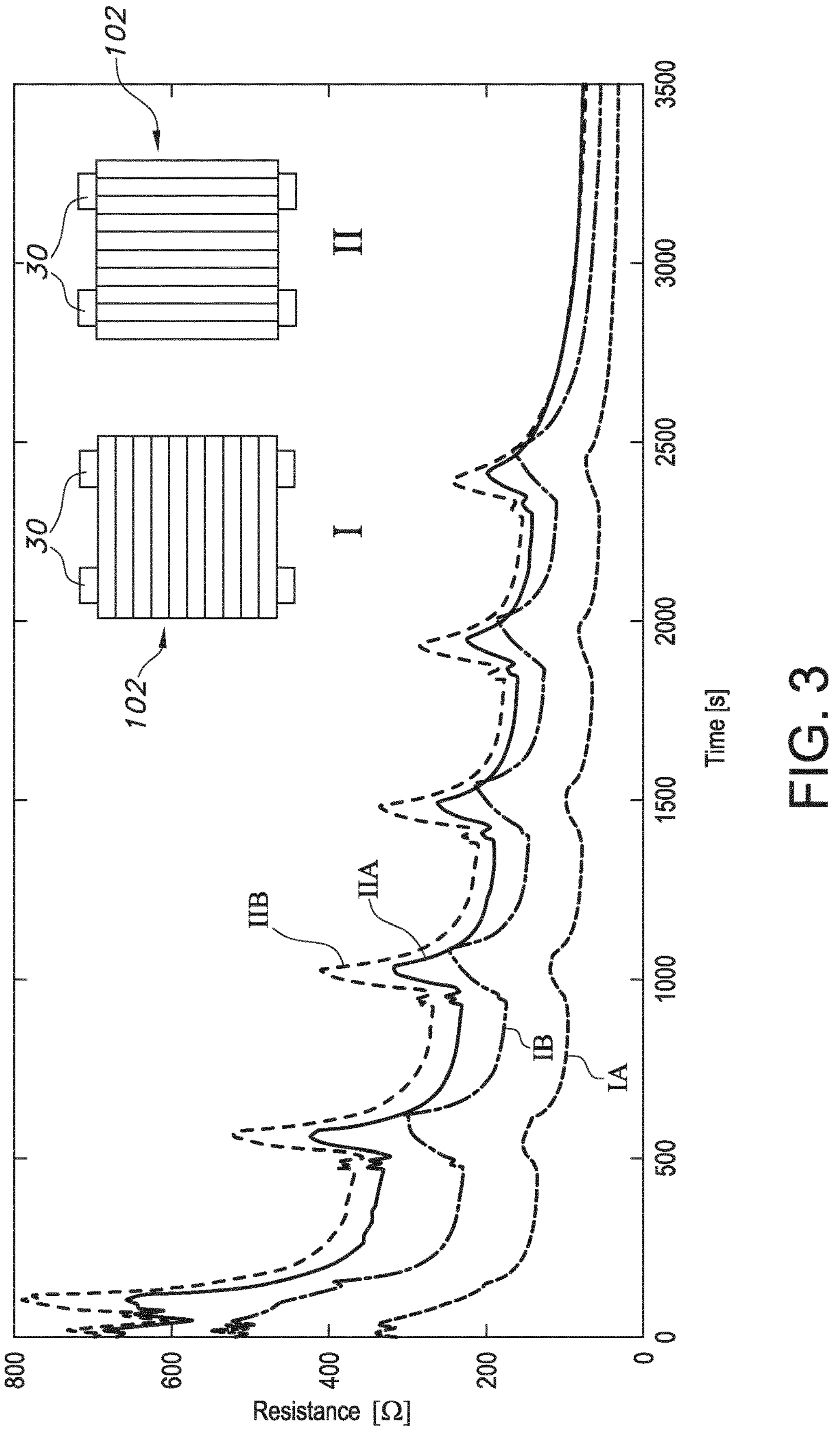

FIG. 3 depicts some further aspects of the system 1 and the method. The four graphs show measured resistances during a depositing experiment using the electrode 30 configuration depicted with number I and using the configuration depicted with number II. In configuration I, two electrodes 30 (first electrodes 31) are arranged at the support element 10 and the depositable material 101 is deposited line by line and layer by layer, wherein the lines were perpendicular to the electrodes, as schematically depicted with the lines of deposited material 102. In configuration II the lines are printed parallel to the electrodes 30. In the figures the top layer of deposited material 102 is only visible. This top layer is provided on top of earlier deposited layers 102. By layer-wise depositing, the product 100 was manufactured. The manufacturing was paused for 5 minutes between depositing successive layers 102. Further, the experiment was carried out with different flows of the depositable materials 101. For the graphs indicated with IA and IIA the used flow was a set as the base flow. For the graphs indicated with IB and IIB the flow was increased to 110% of the base flow.

The graphs show periodic peaks indicating the start of the print of successive layers (compare to FIG. 2). Furthermore, it becomes clear that every added layer lowers the total resistance. It is noted that the resistance starts high and drops before the first layer is printed. This relates to an experimental set-up and is not relevant for the discussion of the measurements. The measurements further show that increasing the flow with 10% extra depositable material 101 yields a higher resistance than the control (compare IIB to IIA, and IB to IA). Further depositing perpendicular to the electrode configuration (IA and IB) yields a lower resistance than depositing parallel to the electrode 30 (IIA and IIB) (even after several days). Moreover for the graphs IA and IB (perpendicular deposition) the peak of the first layer is very small compared to the other peaks. Finally, the peaks for graphs IIA and IIB always seem sharper and more pronounced than for IA and IB. This experiment may especially show the sensitivity of the system and the method. The measurements show strong qualitative similarity for different print settings and materials (experiments were repeated with other materials 101), enabling an easy comparison of results. Resistance (changes) during measurements is (are) highly correlated with the resistances after cooling down, allowing for quality monitoring and optimization of any 3D print.

Figure 4:
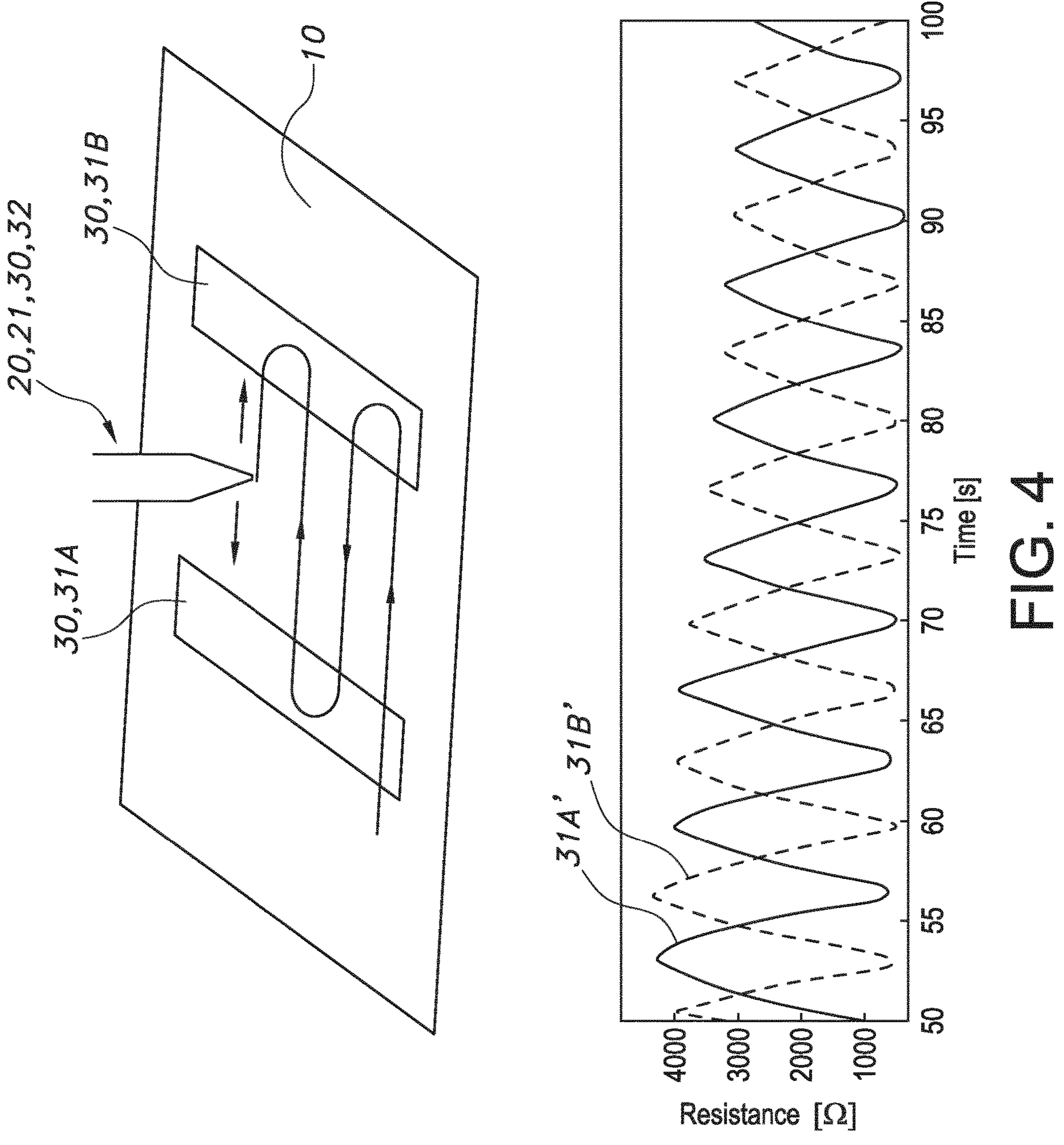

In FIG. 4 some further aspects are depicted. The top figure schematically depicts a pathway of the deposition of material addition system 20, especially the nozzle 21 along the support element 10. The arrows depicted next to the nozzle 21 indicate that the nozzle 21 may translate back and forth relative to the support element 10 in this embodiment. It will be understood that during depositing several layer, the nozzle may further translate relative in a direction perpendicular to the support element 10. Moreover, one or more of the nozzle 21 and the support element 10 may translate relative to the other in any 3-dimensional direction. The support element 10 comprises two first electrodes 30,31, respectively indicated with the reference numbers 31A and 31B. The nozzle 21 comprises the second electrode 30,32. In the figure given below, two graphs are depicted of the measured resistance versus the time between either the second electrode 32 and first electrode 31 indicated with reference 31A or the second electrode 32 and the other first electrode 31B, during depositing material with the nozzle 21. The respective graphs are indicated with reference 31A' and 31B', respectively. During depositing, a track, line, or beam of depositable material 101 was printed wherein without crossing the outer edges of the first electrodes 31 as is indicated by the track of the nozzle 21 in the figure. The graphs depict that the resistance measurements from bed electrodes 31 to nozzle 32 also allow for tracking the nozzle location. When the nozzle 21 moves towards one end of the support element 10, the measured resistance from the electrode 31 arranged at that side decreases, whereas it increases for the electrode on the other edge. Again, the figure shows a decrease in overall resistance with an increasing number of layers (every peak represents a layer).

Hence, in embodiments, the invention provides a method for electrical impedance measurements (e.g. tomography) used for in-situ impedance measurements for layer-wise additive manufacturing techniques with conductive materials.

Further, in embodiments, the invention provides a system for electrical impedance measurements during printing for layer-wise additive manufacturing with conductive materials in which a single electrode or an electrode grid is present on the build plate for impedance measurements during printing.

In specific embodiments, a nozzle or probe is used as additional electrode for (tomographic) impedance measurements.

In further specific embodiments, the electrodes are multiplexed for impedance measurements between electrode pairs.

The invention especially relates to Electrical Impedance Measurement Platform for In-Situ Monitoring of Layer-Wise Additive Manufacturing of Conductive Materials.

The term "plurality" refers to two or more. Furthermore, the terms "a plurality of" and "a number of" may be used interchangeably The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%. For numerical values it is to be understood that the terms "substantially", "essentially", "about", and "approximately" may also relate to the range of 90%-110%, such as 95%-105%, especially 99%-101% of the values(s) it refers to.

The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising"

may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A system for additive manufacturing of a product from a depositable material, wherein the depositable material is electrically conductive, wherein the system comprises a support element, a material addition system, and at least two electrodes;

wherein the system comprises a fused deposition modeling system, wherein the material addition system is configured to melt the depositable material being deposited;

wherein the support element is configured for supporting the product;

the at least two electrodes comprise one or more first electrodes configured at a surface of the support element;

the material addition system is configured for depositing the depositable material at one or more of (i) the support element and (ii) deposited material, thereby forming the product;

wherein the material addition system comprises a nozzle for layer-wise depositing of the depositable material at the one or more of the support element and the deposited material; and any one of the electrodes is configured for (i) electrically contacting the depositable material being deposited or (ii) electrically contacting the deposited material, during depositing the depositable material, wherein (i) the depositable material being deposited in combination with at least a portion of the deposited material arranged between the electrode and another one of the electrodes define an electrically conductive path or (ii) at least a portion of the deposited material arranged between the electrode and another one of the electrodes define the electrically conductive path.

2. The system according to claim 1, wherein the electrodes comprise a second electrode comprised by the material addition system, wherein the second electrode is configured for contacting the depositable material being deposited, wherein the depositable material being deposited in combination with at least the portion of the deposited material contacting a respective first electrode define the electrical conductive path between the second electrode and the respective first electrode.

3. The system according to claim 1, further comprising a plurality of first electrodes, wherein at least the portion of the deposited material contacting any one of the first electrodes and another one of the first electrodes defines the electrically conductive path between the respective first electrode and the another one of the first electrodes.

4. The system according to claim 3, wherein the surface of the support element defines a network of the first electrodes.

5. The system according to claim 1 wherein the system comprises a measuring system configured for measuring one or more of an impedance and a resistance through one or more of the electrically conductive paths.

6. The system according to claim 5, wherein the system comprises at least three electrodes, wherein the measuring system further comprises a multiplexer system functionally coupled to the electrodes, and wherein the system is configured for measuring the one or more of the impedance and the resistance between pairs of selected electrodes of the electrode through the respective electrically conductive paths defined between the electrodes of the pairs of electrodes, wherein the selected electrodes of each pair are functionally coupled to each other by the multiplexer system.

7. The system according to claim 1, wherein the depositable material comprises electrically conductive particles.

* * * * *